J. N. WHIPPLE.
Vehicle Running-Gear.

No. 205,595.  Patented July 2, 1878.

Witnesses.
A. Ruppert
J. G. Mason

Inventor.
J. N. Whipple
D. P. Holloway & Co
Att'y

UNITED STATES PATENT OFFICE.

JOEL N. WHIPPLE, OF VOLGA CITY, IOWA.

IMPROVEMENT IN VEHICLE RUNNING-GEARS.

Specification forming part of Letters Patent No. 205,595, dated July 2, 1878; application filed January 29, 1878.

*To all whom it may concern:*

Be it known that I, JOEL N. WHIPPLE, of Volga City, in the county of Clayton and State of Iowa, have invented new and useful Improvements in Carriages, of which the following is a specification:

The object of the first part of this invention is to equalize the weight in a buggy or carriage, bringing the same amount of pressure on both springs at the same time, thus always keeping the body in a horizontal position, notwithstanding the weight may be placed on either side. The object of the second part is to prevent the king-bolt from being broken, and also to lessen the amount of jarring occasioned by passing over rough roads.

Figure 1:
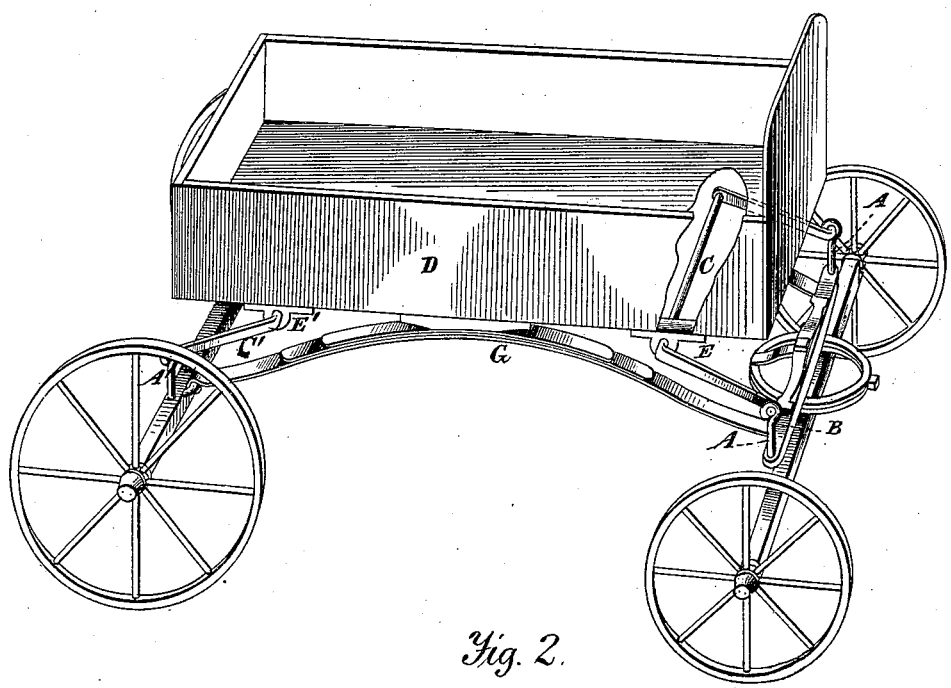
Figure 2:
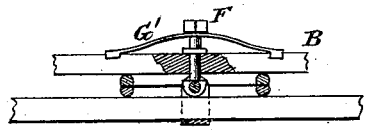

In the annexed drawing, making a part of this specification, Figure 1 is a perspective view of the wagon, showing the positions of the equalizers. Fig. 2 is a front elevation, partly in section, showing the king-bolt and joint.

The same letters are employed in both figures in the indication of identical parts.

A A are stationary posts made fast to the upper side of the cross-bar B. In the upper ends of these posts eyes are formed, in which the double crank-bars C are allowed to turn. A' A' are similar posts made fast to the upper side of the hind axle, and for the same purpose. C C' are double crank-bars passing under the bottom of the bed D of the vehicle, turning in the bearings E E' secured to the bottom of the bed. The wrists of the bars work in eyes formed in the upright posts A A and A' A'. The body D resting upon both the rods C C', the weight, by the action of the double cranks, will be transferred equally to both springs G G, so that an equilibrium of pressure on the springs is maintained wherever the weight is placed in the body.

The king-bolt F, by which the cross-bar B and front axle are connected, instead of passing through the axle, is made with a joint where it is attached to the top, as shown in Fig. 2, so that it may yield, and thus avoid being broken, if one of the front wheels suddenly gets into a hole. G' is a spring placed on top of the cross-bar, which serves to relieve the strain suddenly brought on the king-pin F.

I do not claim to be the inventor, broadly, of the principle of this mode of hanging carriages, as crank-rods have been used heretofore for equalizing the pressure on the side springs. My invention is distinguished from the heretofore-known devices of accomplishing the same result in the simple arrangement of the crank-rods supporting the body of the vehicle and resting on bearings on the axle and front cross-bar, instead of the more complicated devices heretofore used.

I am also aware that king-bolts have been connected to the front axle by a hinge. My invention is distinguished from these in the addition of the combination of a spring to relieve the strain and steady the king-bolt.

I claim as my invention and desire to secure by Letters Patent—

1. In combination with the body, axles, and side springs of a vehicle, the double crank-bars C C', turning on bearings on the body, and supports at both their lower ends on posts attached to the hind axle and front cross-bar, substantially as set forth.

2. In combination with the front axle of a vehicle, a king-bolt, F, attached thereto by a hinge-joint, which gives the king-bolt transverse oscillation, and spring G', resting on the axle and bearing against the king-bolt, substantially as set forth.

In testimony whereof I have signed my name to this specification in the presence of two subscribing witnesses.

JOEL N. WHIPPLE.

Witnesses:
J. M. EMERY,
JAMES K. HILL.